United States Patent
Hikida et al.

(10) Patent No.: US 7,395,326 B2
(45) Date of Patent: Jul. 1, 2008

(54) NETWORK MANAGEMENT APPARATUS

(75) Inventors: Yoshihiro Hikida, Miyagi (JP); Nobuo Takahashi, Miyagi (JP); Hideaki Sugai, Miyagi (JP)

(73) Assignee: Fujitsu Limited, Kawasaki (JP)

( * ) Notice: Subject to any disclaimer, the term of this patent is extended or adjusted under 35 U.S.C. 154(b) by 795 days.

(21) Appl. No.: 10/402,178

(22) Filed: Mar. 27, 2003

(65) Prior Publication Data

US 2004/0006617 A1  Jan. 8, 2004

(30) Foreign Application Priority Data

Jul. 2, 2002  (JP) .............................. 2002-193093

(51) Int. Cl.
*G06F 15/173* (2006.01)
(52) U.S. Cl. .................. 709/223; 709/224; 709/225; 709/226; 714/26; 714/27; 714/43; 714/47; 370/252
(58) Field of Classification Search ......... 709/223–226; 714/26–27, 43, 47; 370/252
See application file for complete search history.

(56) References Cited

U.S. PATENT DOCUMENTS

| | | | | |
|---|---|---|---|---|
| 6,128,656 | A * | 10/2000 | Matchefts et al. | 709/223 |
| 6,128,657 | A * | 10/2000 | Okanoya et al. | 709/224 |
| 6,131,117 | A * | 10/2000 | Clark et al. | 709/223 |
| 6,167,445 | A * | 12/2000 | Gai et al. | 709/223 |
| 6,177,942 | B1 * | 1/2001 | Keong et al. | 715/810 |
| 6,282,678 | B1 * | 8/2001 | Snay et al. | 714/712 |
| 6,301,613 | B1 * | 10/2001 | Ahlstrom et al. | 709/223 |
| 6,393,473 | B1 * | 5/2002 | Chu | 709/223 |
| 6,418,468 | B1 * | 7/2002 | Ahlstrom et al. | 709/223 |
| 6,507,565 | B1 * | 1/2003 | Taylor | 370/252 |
| 6,742,141 | B1 * | 5/2004 | Miller | 714/26 |

FOREIGN PATENT DOCUMENTS

| | | |
|---|---|---|
| JP | 9-289508 | 11/1997 |
| JP | 2000-339289 | 12/2000 |

* cited by examiner

*Primary Examiner*—Bunjob Jaroenchonwanit
*Assistant Examiner*—Thomas J Dailey
(74) *Attorney, Agent, or Firm*—Katten Muchin Rosenman LLP

(57) ABSTRACT

A network management apparatus performing trouble-shooting in each device state and improving the operation efficiency and workability in maintenance management operations. A table storage unit stores a device status table, a restriction condition table, and a trouble shooting table. An analysis unit determines whether a status change request satisfies the restriction conditions in the current device state. If the restriction conditions are not satisfied but trouble can be avoided, all the trouble shooting data are extracted until the restriction problems are eliminated. If the restriction conditions are not satisfied and trouble cannot be avoided, the cause for not being able to avoid trouble is extracted. Thus, an analysis of normality of the status change request is conducted. A user interface unit sends the extracted trouble shooting data or the cause for not being able to avoid trouble. A device communication unit transmits a command corresponding to the status change request.

9 Claims, 14 Drawing Sheets

T1  DEVICE STATUS TABLE

| DEVICE COMPONENT NAME | ATTRIBUTE NAME | ATTRIBUTE VALUE |
|---|---|---|
| OS1-TC-1 | state | IS-NR |
|  | vendid | FC9518AIA1 |
|  | dom | 01.09 |
|  | cleli | WM2WHR0CAA |
| OS1-TC-2 | state | IS-NR |
|  | vendid | FC9518AIA1 |
|  | dom | 01.09 |
|  | cleli | WM2WHR0CAA |
| OS1-TC-3 | state | IS-NR |
|  | vendid | FC9518AIA1 |
|  | dom | 01.09 |
|  | cleli | WM2WHR0CAA |

S13 → OS1-TC-1 state row
S8 → OS1-TC-2 state row
S3 → OS1-TC-3 state row

FIG. 2

T2 RESTRICTION CONDITION TABLE

| | CONTENTS OF A REQUEST TO NE ||| | RESTRICTION CONDITIONS |||
|---|---|---|---|---|---|---|---|
| STATUS CHANGE REQUEST NAME | DEVICE COMPONENT NAME | ATTRIBUTE NAME | ATTRIBUTE VALUE | CODE | DEVICE COMPONENT NAME | ATTRIBUTE NAME | ATTRIBUTE VALUE |
| ED-EQPT | OS1-TC-1 | state | OOS-MA | 1 | — | — | — |
| ED-EQPT | OS1-TC-2 | state | OOS-MA | 1 | OS1-TC-1 | state | UAS |
| ED-EQPT | OS1-TC-3 | state | OOS-MA | 1 | OS1-TC-2 | state | UAS |
| DLT-EQPT | OS1-TC-1 | state | UAS | 1 | OS1-TC-1 | state | OOS-MA |
| DLT-EQPT | OS1-TC-2 | state | UAS | 1 | OS1-TC-2 | state | OOS-MA |
| DLT-EQPT | OS1-TC-3 | state | UAS | 1 | OS1-TC-3 | state | OOS-MA |

FIG. 3

T2 RESTRICTION CONDITION TABLE

| EXECUTION RIGHTS t2-3 | | MULTIPLE CONDITIONS t2-4 | | ERROR CODE t2-5 | |
|---|---|---|---|---|---|
| NMS | NE | LINK | LOGIC RELATIONSHIP | | |
| 3 | 3 | N | — | SNVS | |
| 3 | 3 | N | — | SNVS | S17 |
| 3 | 3 | N | — | SNVS | S12 |
| 3 | 3 | N | — | SNVS | S7 |
| 3 | 3 | N | — | SNVS | |
| 3 | 3 | N | — | SNVS | S2 |

T3 TROUBLE SHOOTING TABLE

| | CHANGE CONDITIONS | | | | | |
|---|---|---|---|---|---|---|
| | CURRENT DEVICE STATUS VALUE | | | CHANGED DEVICE STATUS VALUE | | |
| | DEVICE COMPONENT NAME | ATTRIBUTE NAME | ATTRIBUTE VALUE | DEVICE COMPONENT NAME | ATTRIBUTE NAME | ATTRIBUTE VALUE |
| S24 | OS1-TC-1 | state | FLT | — | — | — |
| | OS1-TC-1 | state | IS-NR | OS1-TC-1 | state | OOS-MA |
| S15 | OS1-TC-1 | state | IS-NR | OS1-TC-1 | state | UAS |
| | OS1-TC-1 | state | OOS-MA | OS1-TC-1 | state | UAS |
| | OS1-TC-2 | state | FLT | — | — | — |
| S10 | OS1-TC-2 | state | IS-NR | OS1-TC-2 | state | OOS-MA |
| | OS1-TC-2 | state | IS-NR | OS1-TC-2 | state | UAS |
| | OS1-TC-3 | state | FLT | — | — | — |
| S5 | OS1-TC-3 | state | IS-NR | OS1-TC-3 | state | OOS-MA |
| | OS1-TC-3 | state | IS-NR | OS1-TC-3 | state | UAS |
| | OS1-TC-3 | state | OOS-MA | OS1-TC-3 | state | UAS |

FIG. 6

T3 TROUBLE SHOOTING TABLE t3-2 CONTENTS OF THE TROUBLE SHOOTING DATA

| EXIST-ANCE | STATUS CHANGE REQUEST NAME | DEVICE COMPONENT NAME | ATTRIB-UTE NAME | ATTRIB-UTE VALUE | REMARKS |
|---|---|---|---|---|---|
| 2 | — | — | — | — | Please try again after restoring OS1-TC-1 |
| 1 | ED-EQPT | OS1-TC-1 | state | OOS-MA | Put OS1-TC-1 in a maintained state | ← S24
| 1 | ED-EQPT | OS1-TC-1 | state | OOS-MA | Put OS1-TC-1 in a maintained state |
| 1 | DLT-EQPT | OS1-TC-1 | — | — | Delete OS1-TC-1 | ← S15
| 1 | DLT-EQPT | OS1-TC-1 | — | — | Delete OS1-TC-1 |
| 2 | — | — | — | — | Please try again after restoring OS1-TC-2 |
| 1 | ED-EQPT | OS1-TC-2 | state | OOS-MA | Put OS1-TC-2 in a maintained state |
| 1 | ED-EQPT | OS1-TC-2 | state | OOS-MA | Put OS1-TC-2 in a maintained state | ← S10
| 1 | DLT-EQPT | OS1-TC-2 | — | — | Delete OS1-TC-2 |
| 1 | DLT-EQPT | OS1-TC-2 | — | — | Delete OS1-TC-2 |
| 2 | — | — | — | — | Please try again after restoring OS1-TC-3 |
| 1 | ED-EQPT | OS1-TC-3 | state | OOS-MA | Put OS1-TC-3 in a maintained state | ← S5
| 1 | ED-EQPT | OS1-TC-3 | state | OOS-MA | Put OS1-TC-3 in a maintained state |
| 1 | DLT-EQPT | OS1-TC-3 | — | — | Delete OS1-TC-3 |
| 1 | DLT-EQPT | OS1-TC-3 | — | — | Delete OS1-TC-3 |

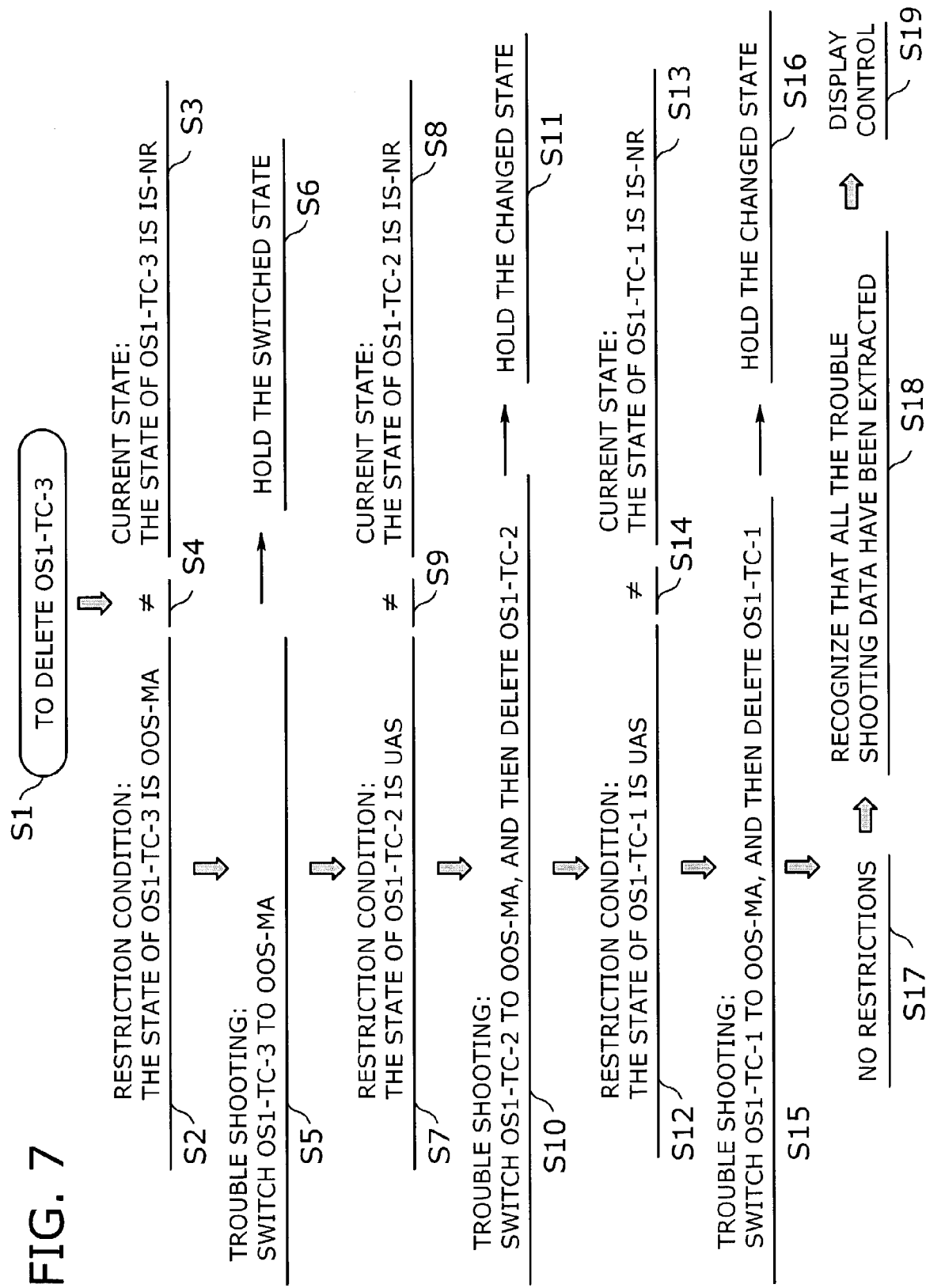

| NO. | EXECU-TION | STATUS CHANGE REQUEST | COMMAND |
|---|---|---|---|
| #1 | ✓ | Put OS1-TC-1 in a maintained state | ED-EQPT:OS1-TC-1:::::OOS; |
| #2 | ✓ | Delete OS1-TC-1 | DLT-EQPT:OS1-TC-1:::; |
| #3 | ✓ | Put OS1-TC-2 in a maintained state | ED-EQPT:OS1-TC-2:::::OOS; |
| #4 | ✓ | Delete OS1-TC-2 | DLT-EQPT:OS1-TC-2:::; |
| #5 | ✓ | Put OS1-TC-3 in a maintained state | ED-EQPT:OS1-TC-3:::::OOS; |
| #6 | ✓ | Delete OS1-TC-3 | DLT-EQPT:OS1-TC-3:::; |

13a

B1 ALL-SELECT
B2 ALL-SELECT CANCEL
B3 ALL EXECUTE
B4 ONE-COMMAND EXECUTE
B5 STOP

FIG. 8

T1a    DEVICE STATUS TABLE

| DEVICE COMPONENT NAME | ATTRIBUTE NAME | ATTRIBUTE VALUE |
|---|---|---|
| OS1-TC-1 (S13) | state | FLT |
| | vendid | FC9518AIA1 |
| | dom | 01.09 |
| | cleli | WM2WHR0CAA |
| OS1-TC-2 (S8) | state | IS-NR |
| | vendid | FC9518AIA1 |
| | dom | 01.09 |
| | cleli | WM2WHR0CAA |
| OS1-TC-3 (S3) | state | IS-NR |
| | vendid | FC9518AIA1 |
| | dom | 01.09 |
| | cleli | WM2WHR0CAA |

FIG. 10

NETWORK MANAGEMENT APPARATUS

BACKGROUND OF THE INVENTION (1) Field of the Invention

The present invention relates to network management apparatuses, and more particularly, to a network management apparatus that performs network management operations.

(2) Description of the Related Art

In recent years, a wider variety of information network services have been expected, and the information infrastructure for providing these services has become larger and complicated. In this trend, there is an increasing demand for network management apparatuses (NMA) that perform maintenance management of network devices (or network elements: NEs) such as transmission devices that constitute a network.

To change the current state of a NE, an operator inputs a status change request into a network management apparatus. Upon receipt of the status change request from the operator, the network management apparatus generates a command corresponding to the request, and transmits the command to the corresponding NE. The network management apparatus then receives data in response to the command. By doing so, the state of the NE is changed, and the device status in the network is controlled. Also, to prevent a critical failure due to a wrong operation in the network, complicated restriction conditions are normally set in each NE.

Here, the restriction conditions refer to the rules about the relationships between the state of a NE and acceptable status change requests. For example, the restriction conditions specify that, when the NE is in a state of A, a command of a status change request A is acceptable, but a command of a status change request B is not acceptable.

Therefore, an operator needs to make a status change request so as to satisfy the restriction conditions. Upon receipt of a command of a status change request, a NE accepts the command if the command satisfies the restriction conditions, or returns an error response to the command to the network management apparatus if the command does not satisfy the restriction conditions, depending on the device status at that point.

To efficiently manage the history of operations such as command transmissions, each operator needs to skip unnecessary operations. When an operator is to send a status change request to a NE, the operator needs to confirm in advance whether the status change request satisfies the restriction conditions in the current NE state. By doing so, a proper status change request can be transmitted, and an error response from an NE can be avoided.

By the conventional management control, however, an operator needs to search for the restriction conditions for each status change request in advance, using the instruction manual or the help function for each NE, regardless of whether the NE is a newly introduced one or an old one. Furthermore, the operator needs to check whether the current device status satisfies the restriction conditions. Carrying out these processes is very troublesome, often resulting in a poor workability in maintenance management.

Also, if a command of a status change request is not accepted by a NE and an error response is sent from the NE, the operator has to find out the way to have the command accepted by the NE, studying the error contents, the current device state of the NE, and the restriction conditions or the like. Furthermore, if there are several solutions for the problem, the operator needs to try each solution. Accordingly, there are so many processes each operator has to carry out in the conventional network management operation, resulting in a poor operation efficiency.

Meanwhile, Japanese Laid-Open Patent Application No. 2000-339289 discloses a network management method. According to this method, the cause of trouble that can be estimated from the error contents and the solutions for the trouble are generated and stored in advance. When an error occurs, the possible causes of trouble and the solutions are displayed through the help function. The operator then determines the cause of trouble, and then inputs a new command.

In this conventional method, however, the current operation state of the NE is not taken into consideration, and the cause of trouble in the current state cannot be clearly pointed out. Therefore, the operator has to search for the cause of trouble and solutions, studying the possible causes of trouble and solutions. As a result, the operation efficiency is lowered. Furthermore, to produce solutions for problems in advance, it is necessary to store all the procedures of solving each problem. In such a case, some procedures unnecessary in the current operation state are also stored, resulting in a poorer management efficiency.

SUMMARY OF THE INVENTION

Taking into consideration the above, it is an object of the present invention to provide a network management apparatus that performs a trouble shooting operation suitable for the current state of each network element, and improves the operation efficiency and workability in maintenance management operations.

The above object of the present invention is achieved by a network management apparatus that performs a network management operation. This network management apparatus includes: a table storage unit that stores a device status table for managing current device statuses, a restriction condition table for managing restriction conditions for each network device to receive a status change request, and a trouble shooting table for managing trouble shooting data for solving problems that are the causes of restrictions; an analysis unit that determines from the tables stored in the table storage unit whether a status change request satisfies restriction conditions in a current device state, extracts all trouble shooting data until the restriction problems are eliminated when the restriction conditions are not satisfied but trouble can be avoided, and extracts causes for not being able to avoid trouble when the restriction conditions are not satisfied and trouble cannot be avoided, thereby performing an analysis of normality of the status change request; a user interface unit that performs a user interface operation, and sends the extracted trouble shooting data or the cause for not being able to avoid trouble; and a device communication unit that generates a command corresponding to a status change request for solving a problem, based on the trouble shooting data, transmits the command to a corresponding network device, and receives a response from the network device.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 illustrates an example of a device status table according to the present invention;

FIG. 3 illustrates a part of an example of a restriction condition table according to the present invention;

FIG. 4 illustrates a part of the example of the restriction condition table according to the present invention;

FIG. 5 illustrates a part of an example of a trouble shooting table according to the present invention;

FIG. 6 illustrates a part of the example of the trouble shooting table according to the present invention;

FIG. 7 illustrates a state transition when the network device of OS1-TC-3 is to be deleted;

FIG. 8 illustrates an example of the display screen of the network management apparatus according to the present invention;

FIG. 10 illustrates the structure of another example of the device status table according to the present invention;

DESCRIPTION OF THE PREFERRED EMBODIMENTS

The following is a description of embodiments of the present invention, with reference to the accompanying drawings.

Figure 1:
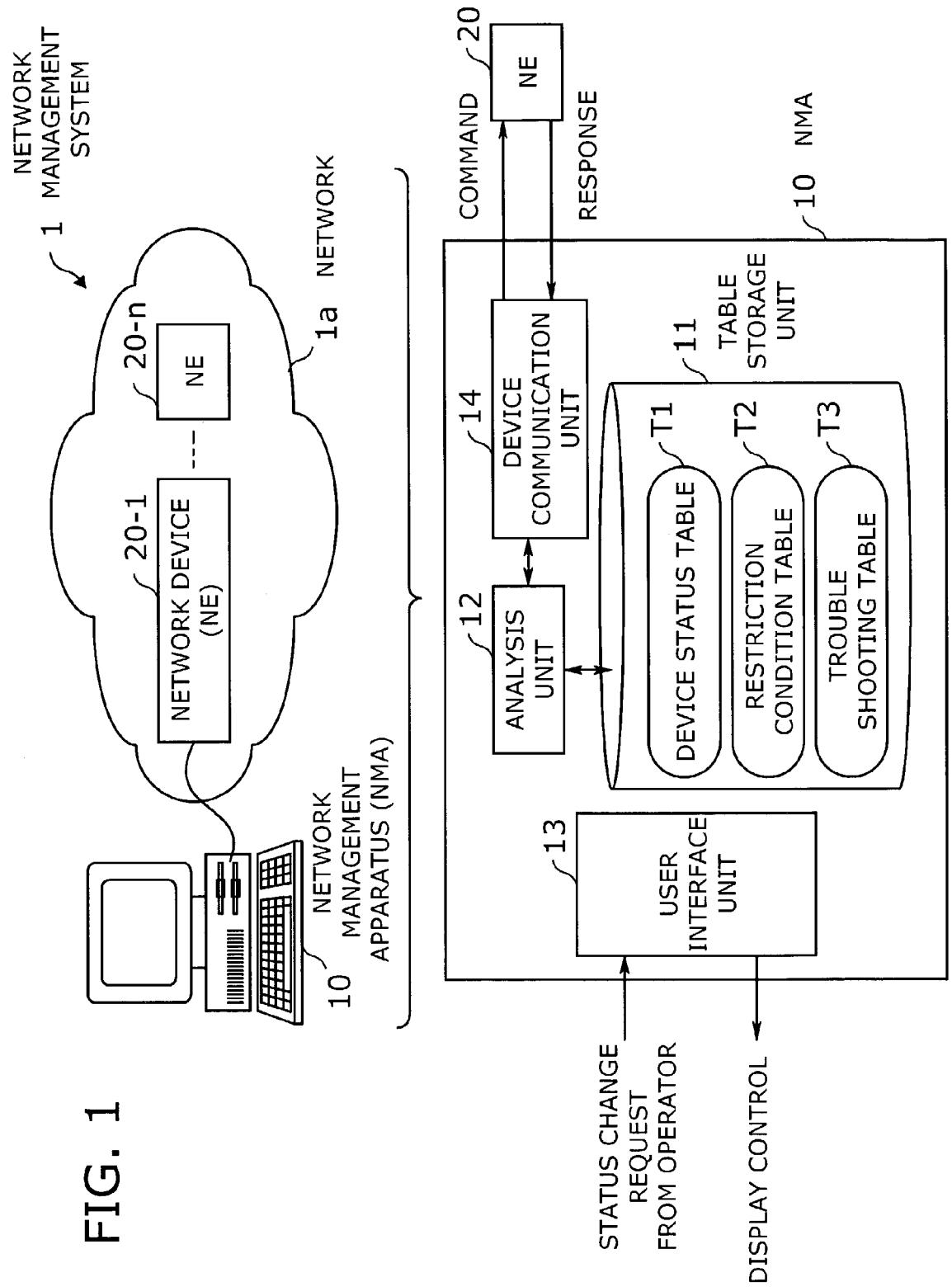
FIG. 1 illustrates the principles of a network management apparatus according to the present invention.

FIG. 1 illustrates the principles of a network management apparatus in accordance with the present invention. A network management system 1 includes network devices (network elements: hereinafter referred to as "NEs" or simply as "devices") 20-1 through 20-n that constitute a network 1a, and a network management apparatus (NMA) 10 that manages the NEs 20-1 through 20-n.

In the network management apparatus 10, a table storage unit 11 stores and manages a device status table T1, a restriction condition table t2, and a trouble shooting table T3. The device status table T1 manages the current device statuses of the NEs 20-1 through 20-n (collectively referred to as "NE 20").

The restriction condition table T2 manages the restriction conditions for the NE 20 to receive a status change request. The trouble shooting table T3 manages trouble shooting data for solving problems that cause restrictions. The data values in these tables can be rewritten, if necessary, even when the system is in operation. Each of the tables will be described later in detail, with reference to FIGS. 2 through 6.

An analysis unit 12 performs an analysis of normality of each status change request. More specifically, based on the data stored in the table storage unit 11, the analysis unit 12 determines whether a status change request satisfies the restriction conditions in the current device state.

In a case where the restriction conditions are not satisfied but trouble can be avoided, the analysis unit 12 extracts all the trouble shooting data until all the restriction problems are eliminated. In a case where the restriction conditions are not satisfied and trouble cannot be avoided, the analysis unit 12 extracts the cause for not being able to avoid the trouble. This process will be described later in detail, with reference to FIG. 7 and other drawings that follow.

A user interface unit 13 performs a user interface operation to notice the extracted trouble shooting data or the cause for not being able to avoid the trouble (display control). A device communication unit 14 transmits commands to the NE 20 and receives responses from the NE 20. For instance, based on the trouble shooting data, the device communication unit 14 generates and transmits a command corresponding to a status change request for trouble shooting to the NE 20, and receives a response to the command.

Referring now to FIGS. 2 through 6, the table storage unit 11 will be described in detail. (It should be noted that the codes such as "S13" and "S7" in FIGS. 2 through 6 indicate the steps in an operation according to the present invention, and will appear again in FIGS. 7 and 11.) FIG. 2 illustrates an example of the device status table. The device status table T1 manages the data of device statuses, and includes device component names, attribute names, and attribute values. For example, in FIG. 2, the current operation status ("state") of the NE having a component name of OS1-TC-1 is IS-NR (in operation).

In this specification, "state" is taken as an example of an attribute name, and therefore explanation for the other attributes names ("vendid", "dom", and "cleli") and the corresponding attribute values (FC9518AIA1, 01.09, and WM2WHR0CAA) shown in FIG. 2 is omitted herein.

FIGS. 3 and 4 illustrate an example of the restriction condition table. The restriction condition table T2 includes request contents t2-1 for the NEs, restriction conditions t2-2, execution rights t2-3, multiple conditions t2-4, and error codes t2-5. The request contents t2-1 for the NEs include status change request names, device component names, attribute names, and attribute values. The restriction conditions t2-2 include codes, device component names, attribute names, and attribute values. The execution rights t2-3 include items such as apparatuses and devices. The multiple conditions t2-4 include links and logic relationships.

In accordance with this restriction condition table T2, to have a request in the request contents t2-1 accepted, the conditions included in the restriction conditions t2-2 need to be satisfied. Taking the second row of the data as an example, the request contents t2-1 have a status change request name of ED-EQPT (a request to switch to a maintained state), a device component name of OS1-TC-2, an attribute name of "state", and an attribute value of OOS-MA (indicating a maintained state).

The restriction conditions t2-2 have a code of "1" (each code will be explained later), a device component name of OS1-TC-1, an attribute name of "state", and an attribute value of UAS (an erased state or an unregistered state).

This indicates that the NE having the component name of OS1-TC-1 must be in the state of UAS as a restriction condition for the NE of OS1-TC-2 to have the state change request of ED-EQPT and the operation state of OOS-MA. In other words, the NE of OS1-TC-2 cannot be switched to the state of OOS-MA unless the OS1-TC-1 is in the state of UAS.

Likewise, as for the fourth row of the data, the NE of OS1-TC-1 must be in the state of OOS-MA as a restriction condition for the NE of OS1-TC-1 to have a status change request of DLT-EQPT (a request for switching to an erased state) and to switch the operation state to the state of UAS. In other words, the NE of OS1-TC-1 cannot switch to the state of UAS unless it is in the state of OOS-MA.

In the following, the codes, the execution rights t2-3, the multiple conditions t2-4, and the error codes t2-5 will be explained in detail.

When the code is "1", the data is included in the restriction conditions t2-2. If the code is "2", the data is not included in the restriction conditions t2-2.

For instance, in FIG. 3, the code is "1" for the request contents t2-1 for the NE on the second row in the data. Accordingly, the restriction condition is that the NE of OS1-TC-1 should be in the state of UAS. If the code is "2", the restriction condition would be that the NE of OS1-TC-1 must not be in the state of UAS.

The execution rights t2-3 are the rights of each operator necessary for making status change requests to the NEs. The numeral "3" shown in FIG. 4 indicates that the operator has the execution right. The "NMS" shown in the execution rights t2-3 indicates that a user who is logged in to the network management apparatus 10 ("login") has an execution right. The NE column shown in the execution rights t2-3 indicates that a user who is logged in from the network management apparatus 10 to a NE has an execution right.

The multiple conditions t2-4 indicate whether the contents of the restriction conditions t2-2 continue to the next row. If the contents of the restriction conditions t2-2 continue to the next row, the multiple conditions t2-4 have a link "Y". If the contents of the restriction conditions t2-2 do not continue to the next row, the multiple conditions t2-4 have a link "N". The logic relationships of the multiple conditions t2-4 indicate the logics (such as AND or OR) in cases where the contents of the restriction conditions t2-2 continue to the next row.

For example, the link of the multiple conditions t2-4 on the second row of the data is "N" and has no logic relationships in FIG. 4. Accordingly, the contents of the restriction conditions t2-2 of the second row do not continue to the next row. (In other words, the restriction condition is that the NE of OS1-TC-1 is in the state of UAS.) If the multiple conditions t2-4 of the second row of the data have a link "Y" and a logic relationship "AND", and the multiple conditions t2-4 of the third row have a link "N" and no logic relationships, the restriction conditions continue to the third row. In other words, to satisfy the request contents t2-1 for the NE of the second row, the restriction conditions indicate that the NE of OS1-TC-1 should be in the state of UAS, and that the NE of OS1-TC-2 should also be in the state of UAS.

The error codes t2-5 indicate which error code should be outputted in a case where a request included in the request contents t2-1 is made but the restriction conditions t2-2 are not satisfied. In FIG. 4, when the request of any row does not satisfy the restriction conditions t2-2, a code "SNVS" is outputted as an error code.

FIGS. 5 and 6 illustrate an example of the trouble shooting table. Here, the "trouble" is used as an equivalent to the restriction conditions. Accordingly, "to solve a problem" is "to satisfy the restriction conditions". Also, trouble shooting is to take measures to satisfy the restriction conditions. Furthermore, the trouble shooting data are the restriction condition satisfying data that include status change requests for satisfying the restriction conditions.

The trouble shooting table T3 includes change conditions t3-1 and trouble shooting data contents t3-2. The change conditions t3-1 further include current device status values t3-1a and the changed device status values t3-1b. The current device status values t3-1a and the changed device status values t3-1b both include device component names, attribute names, and attribute values. The trouble shooting data contents t3-2 include existence flags, status change request names, device component names, attribute names, attribute values, and remarks.

The trouble shooting table T3 contains the trouble shooting data corresponding to the current attribute values included in the current device status values t3-1a, so as to switch to the attribute values included in the changed device status values t3-1b.

For example, in a case where the NE of OS1-TC-1 currently in the state of IS-NR is to be switched to the state of UAS (the third row of the data in FIGS. 5 and 6), the trouble shooting data indicate that the status change request should be ED-EQPT, the NE of OS1-TC-1 should be changed to OOS-MA, and the status change request should then be changed to DLT-EQPT so that the NE of OS1-TC-1 is deleted.

In other words, to switch the NE of OS1-TC-1 in the state of IS-NR to the state of UAS, the NE of OS1-TC-1 is temporarily switched to the state of OOS-MA, and is then deleted (made unregistered). After the NE of the OS1-TC-1 is put in the deleted state in this manner, a command for switching to the state of UAS is transmitted, so that the NE of OS1-TC-1 can immediately receive the command.

In a case where the NE of OS1-TC-1 is to be switched to the state of UAS (the fourth row of the data in FIGS. 5 and 6), if the current state of the OS1-TC-1 is OOS-MA, the trouble shooting data indicate that the status change request should be changed to DLT-EQPT so as to delete the NE of OS1-TC-1.

In other words, to switch the NE of OS1-TC-1 in the state of OOS-MA to the state of UAS, the NE of OS1-TC-1 should be deleted. After the NE of OS1-TC-1 is put in a deleted state in this manner, a command for switching to the state of UAS is transmitted so that the NE of OS1-TC-1 can immediately receive the command.

The "existence flag" in the table shows "1" when there are trouble shooting data, and "2" when there are no trouble shooting data. In the remarks, the contents of the trouble shooting data are described. As the trouble shooting data, these remarks are displayed on the screen of the network management apparatus 10.

In the following, an operation according to the present invention will be described in detail. Using the data shown in FIGS. 2 through 6, the operation of deleting (unregistering) the NE of OS1-TC-3 in the device name will be described in greater detail. FIG. 7 illustrates a state transition when the NE of OS1-TC-3 is deleted.

[S1] An operator inputs a status change request into the network management apparatus 10 via the user interface unit 13, so as to delete the NE of OS1-TC-3.

[S2] The analysis unit 12 of the network management apparatus 10 reads the restriction conditions for the status change request for deleting the NE of OS1-TC-3 from the table storage unit 11 (more specifically, from the restriction condition table T2 shown in FIGS. 3 and 4). The read restriction conditions indicate that the "state" of the NE of OS1-TC-3 should be OOS-MA.

[S3] The analysis unit 12 reads the current device status of the NE of OS1-TC-3 from the table storage unit 11 (more specifically, from the device status table T1 shown in FIG. 2). The read device status indicates that the "state" of the NE of OS1-TC-3 should be IS-NR.

[S4] The analysis unit 12 determines whether the status change request from the operator satisfies the restriction conditions. To delete the NE of OS1-TC-3, the "state" of the NE of OS1-TC-3 needs to be OOS-MA. However, since the current "state" of the NE of OS1-TC-3 is IS-NR, it is apparent that the restriction conditions are not satisfied.

[S5] The analysis unit 12 then reads the trouble shooting data from the table storage unit 11 (more specifically, from the trouble shooting table T3 shown in FIGS. 5 and 6). Judging from the current device status value t3-1a (OS1-TC-3: "state"=IS-NR), the analysis unit 12 recognizes that the trouble shooting data for the changed device status value t3-1b (OS1-TC-3: "state"=OOS-MA) should indicate "to issue an ED-EQPT command of "state"=OOS-MA to the NE of OS1-TC-3" (i.e., to put the NE of OS1-TC-3 in a maintained state).

[S6] The analysis unit 12 holds the trouble shooting data that have been read in step S5.

[S7] The analysis unit 12 reads the restriction conditions for "issuing an ED-EQPT command of "state"=OOS-MA to the NE of OS1-TC-3" (equivalent to a status change request for switching the NE of OS1-TC-3 to a maintained state) from the table storage unit 11 (more specifically, from the restriction condition table T2 shown in FIGS. 3 and 4). The read restriction conditions indicate that the "state" of the NE of OS1-TC-2 is UAS.

[S8] The analysis unit 12 reads the current device status of the NE of OS1-TC-2 from the table storage unit 11 (more specifically, from the device status table T1 shown in FIG. 2). The read device status indicates that the "state" of the NE of OS1-TC-2 is IS-NR.

[S9] The analysis unit 12 determines whether the read results of step S8 (indicating that the "state" of the NE of OS1-TC-2 is IS-NR) satisfies the restriction conditions. To switch the NE of OS1-TC-3 to a maintained state, the "state" of the NE of OS1-TC-2 needs to be UAS. However, since the current "state" of the NE of OS1-TC-2 is IS-NR, the analysis unit 12 recognizes that the restriction conditions are not satisfied.

[S10] The analysis unit 12 reads the trouble shooting data from the table storage unit 11 (more specifically, from the trouble shooting table T3 shown in FIGS. 5 and 6). Judging from the current device status value t3-1a (OS1-TC-2: "state"=IS-NR), the trouble shooting data for the changed device status value t3-1b (OS1-TC-2: "state"=UAS) should be "to issue a DLT-EQPT command to the NE of OS1-TC-2 after issuing an ED-EQPT command of "state"=OOS-MA" (i.e., to delete the NE of OS1-TC-2 after putting it into a maintained state).

[S11] The analysis unit 12 holds the trouble shooting data that have been read in step S10.

[S12] The analysis unit 12 reads the restriction conditions for "issuing an ED-EQPT command of "state"=OOS-MA to the NE of OS1-TC-2" (equivalent to a status change request for putting the NE of OS1-TC-2 in a maintained state) from the table storage unit 11 (more specifically, from the restriction condition table T2 shown in FIGS. 3 and 4). The read restriction conditions indicate that the "state" of the NE of OS1-TC-1 should be UAS.

[S13] The analysis unit 12 reads the current device status of the NE of OS1-TC-1 from the table storage unit 11 (more specifically, from the device status table T1 shown in FIG. 2). The read device status result indicates that the "state" of the NE of OS1-TC-1 should be IS-NR.

[S14] The analysis unit 12 then determines whether the read result of step S13 (i.e., the "state" of the NE of OS1-TC-1 being IS-NR) satisfies the restriction conditions. To put the NE of OS1-TC-2 in a maintained state, the "state" of the NE of OS1-TC-1 should be UAS. However, since the current "state" of the NE of OS1-TC-1 is IS-NR, the analysis unit 12 recognizes that the restriction conditions are not satisfied.

[S15] The analysis unit 12 reads the trouble shooting data from the table storage unit 11 (more specifically, from the trouble shooting table T3 shown in FIGS. 5 and 6). Judging from the current device status value t3-1a (OS1-TC-1: "state"=IS-NR), the trouble shooting data for the changed device status value t3-1b (OS1-TC-1: "state"=UAS) should be "to issue a DLT-EQPT command after issuing an ED-EQPT command of "state"=OOS-MA to the NE of OS1-TC-1" (i.e., to delete the NE of OS1-TC-1 after putting it in a maintained state).

[S16] The analysis unit 12 holds the trouble shooting data that have been read in step S15.

[S17] The analysis unit 12 then reads the restriction conditions for "issuing an ED-EQPT command of "state"=OOS-MA to the NE of OS1-TC-1" (equivalent to a status change request for putting the NE of OS1-TC-1 in a maintained state) from the table storage unit 11 (more specifically, from the restriction condition table T2 shown in FIGS. 3 and 4). Since there are no descriptions in the table, the restriction condition read result should be "no restriction conditions".

[S18] Since the read result of step S17 is "no restriction conditions", the analysis unit 12 recognizes that all the trouble shooting data have been extracted.

[S19] The user interface unit 13 displays the trouble shooting data held by the analysis unit 12 on the screen of the network management apparatus 10 in order of step S16, step S11, and step S6.

FIG. 8 illustrates an example of the display screen of the network management apparatus 10. A display screen 13a displays items including numbers, execution boxes, status change requests, and commands, and buttons including an all-select button B1, an all-select cancel button B2, an all-execution button B3, a one-command execution button B4, and a stop button B5.

The display example shown in FIG. 8 includes the trouble shooting data extracted through the analysis operation of FIG. 7 (i.e., the status change request and the corresponding command that have been read in the analysis operation), and a status change request (#6) and its corresponding command inputted by the operator.

When the operator inputs a status change request for deleting the NE of OS1-TC-3 into the network management apparatus 10, the network management apparatus 10 automatically carries out the procedures of steps S2 through S19, and extracts all the trouble shooting data to be displayed on the screen.

After the trouble shooting data are displayed, the operator presses the all-select button B1 so as to display check marks in the execution boxes. The operator then presses the all-execution button B3 so as to transmit the commands corresponding to the status change requests to the corresponding NEs in numerical order of #1 to #6. These commands are generated by the device communication unit 14 of the network management apparatus 10.

Conventionally, when the NE of OS1-TC-3 is to be deleted in accordance with the request #6, the operator needs to check the contents of the requests #1 through #5. In the present invention, however, only the contents of the request #6 are inputted into the network management apparatus 10, so that the network management apparatus 10 automatically checks, displays, and executes the requests #1 through #5. Thus, the maintenance management efficiency can be dramatically improved.

Figure 9:
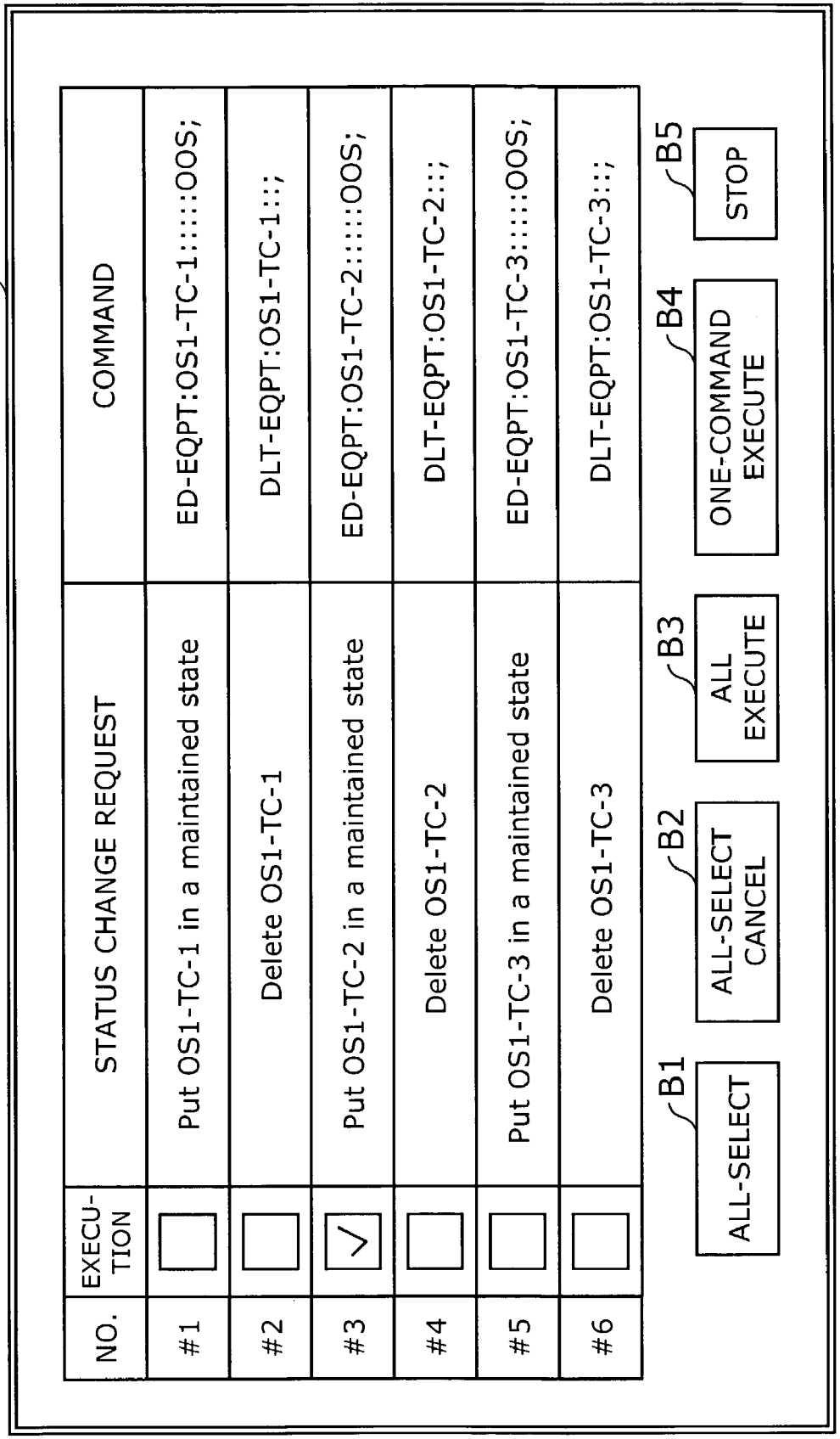
FIG. 9 illustrates another example of the display screen of the network management apparatus according to the present invention.

FIG. 9 shows another example of the display screen of the network management apparatus 10. A display screen 13b shows a case where the operator does not press the all-select button B1 because there are commands he/she does not want to execute.

Looking at the displayed trouble shooting data, the operator decides not to delete the NE of OS1-TC-2 of #4, and designates only the item #3 (thereby putting check marks in the execution boxes of #1, #2, and #3). The operator then presses the all-execution button B3.

In this case, the network management apparatus 10 executes not only the command of #3 but also the commands of #1 and #2. More specifically, the network management apparatus 10 transmits not only the command of #3 to the corresponding NE, but also the commands of #1 and #2 to the corresponding NEs in numerical order.

The difference between the all-execution button B3 and the one-command execution button B4 is as follows. The all-execution button B3 is to execute all the status change requests that have the execution boxes checked. The one-command execution button B4 is to first execute the status change request of #1 among the status change requests that have the execution boxes checked. Every time the one-command execution button B4 is pressed, one request is executed in numerical order.

To execute the status change request of #k, it is necessary to execute the status change requests of #1 through #k−1 in advance. Accordingly, when the operator looks at all the trouble shooting data displayed on the display screen of the network management apparatus 10 and decides not to execute the status change request of #k among the displayed trouble shooting data, the operator designates only the status change request of #k−1 and then presses the all-execution button B3, so that the status change requests of #1 through #k−1 are executed.

As described above, after an operator inputs a status change request, the network management apparatus 10 of the present invention automatically extracts and displays the trouble shooting data suitable for the current device state. All the operator has to do is handle the buttons in accordance with the displayed results. In this manner, the troublesome and time-consuming operations which operators used to do to search for the restriction conditions of each status change request can be omitted. Thus, the operation efficiency and workability in maintenance management operations can be dramatically improved.

Next, an operation in a case where trouble cannot be avoided will be described. In the above description, all the trouble shooting data can be extracted until the restriction problems are eliminated. However, if there is a problem that cannot be avoided during the trouble shooting data reading process, the problem is extracted and displayed as the cause for not being able to avoid trouble.

FIG. 10 illustrates a device status table T1a. This device status table T1a differs from the device status table T1 of FIG. 2 in that the "state" of the NE of OS1-TC-1 is FLT (indicating fault occurrence) and the NE of OS1-TC-1 is not properly operating. The rest of the table T1a is the same as the table T1.

Figure 11:
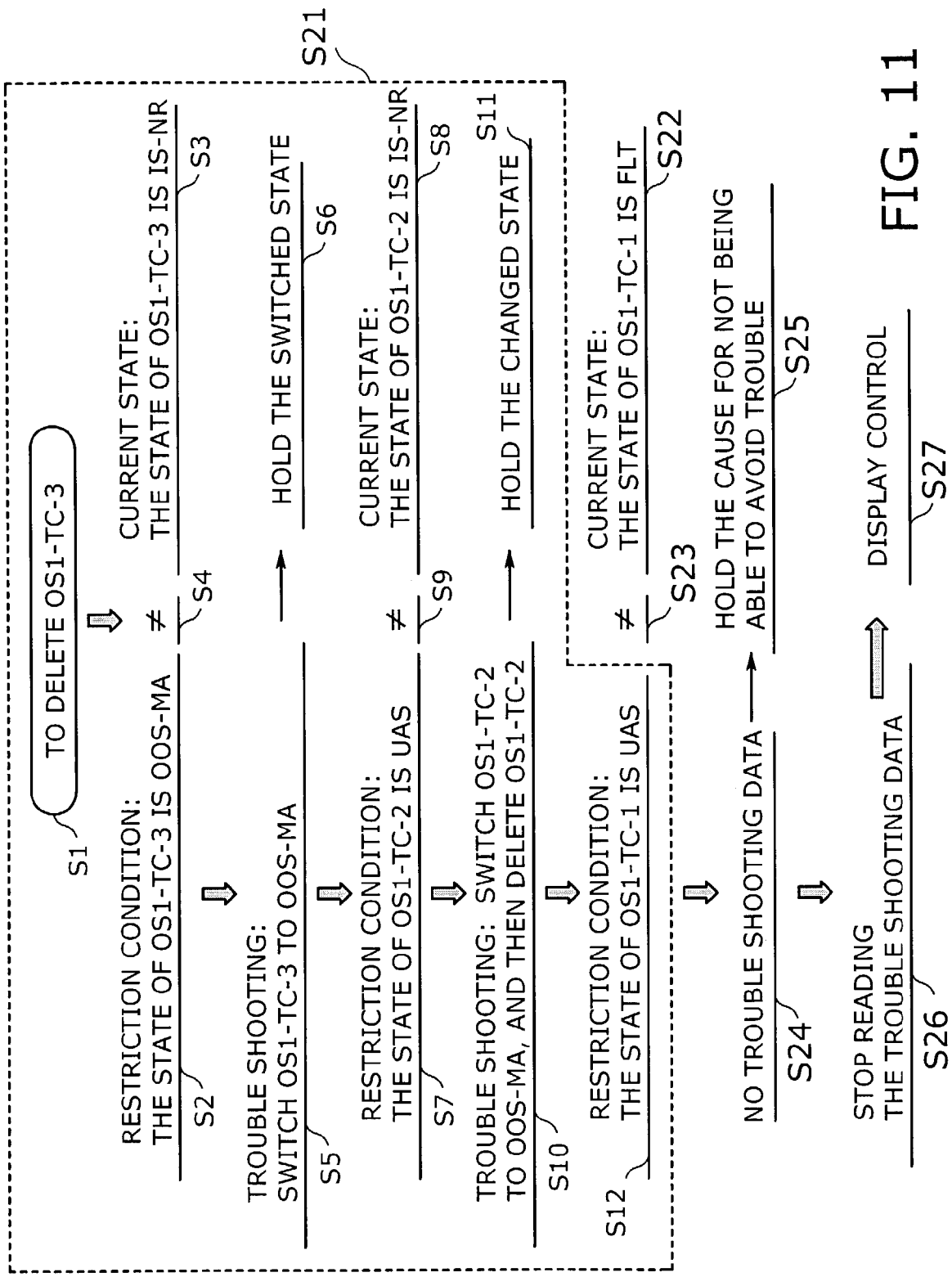
FIG. 11 illustrates a state transition when the network device of OS1-TC-3 is to be deleted.

FIG. 11 illustrates the state transition when the NE of OS1-TC-3 is to be deleted. In the following, an operation having a cause for not being able to avoid trouble will be described.

[S21] Steps S1 through S12 are carried out.

[S22] The analysis unit 12 reads the current device state of the NE of OS1-TC-1 from the table storage unit 11 (more specifically, from the device status table T1a shown in FIG. 10). The read device state indicates that the "state" of the NE of OS1-TC-1 is FLT.

[S23] The analysis unit 12 determines whether the read result of step S22 (the "state" of the NE of OS1-TC-1 being FLT) satisfies the restriction conditions. Here, the "state" of the NE of OS1-TC-1 should be UAS so as to switch the NE of OS1-TC-2 to a maintained state. However, since the current "state" of the NE of OS1-TC-1 is FLT, the analysis unit 12 recognizes that the restriction conditions are not satisfied.

[S24] The analysis unit 12 tries to read the trouble shooting data from the table storage unit 11 (more specifically, from the trouble shooting table T3 shown in FIGS. 5 and 6). However, in a case where the current device status value t3-1a indicates a fault (the "state" of the NE of OS1-TC-1 being FLT), there are no trouble shooting data. Accordingly, the analysis unit 12 recognizes that trouble cannot be avoided (i.e., the restriction conditions cannot be cancelled).

[S25] The analysis unit 12 holds the cause for being unable to avoid trouble (the "state" of the NE of OS1-TC-1 being FLT).

[S26] Having extracted the cause for being unable to avoid trouble, the analysis unit 12 stops reading the trouble shooting data.

[S27] The user interface unit 13 displays the trouble shooting data and the cause for being unable to avoid trouble held in the analysis unit 12 on the display screen of the network management apparatus 10.

Figure 12:
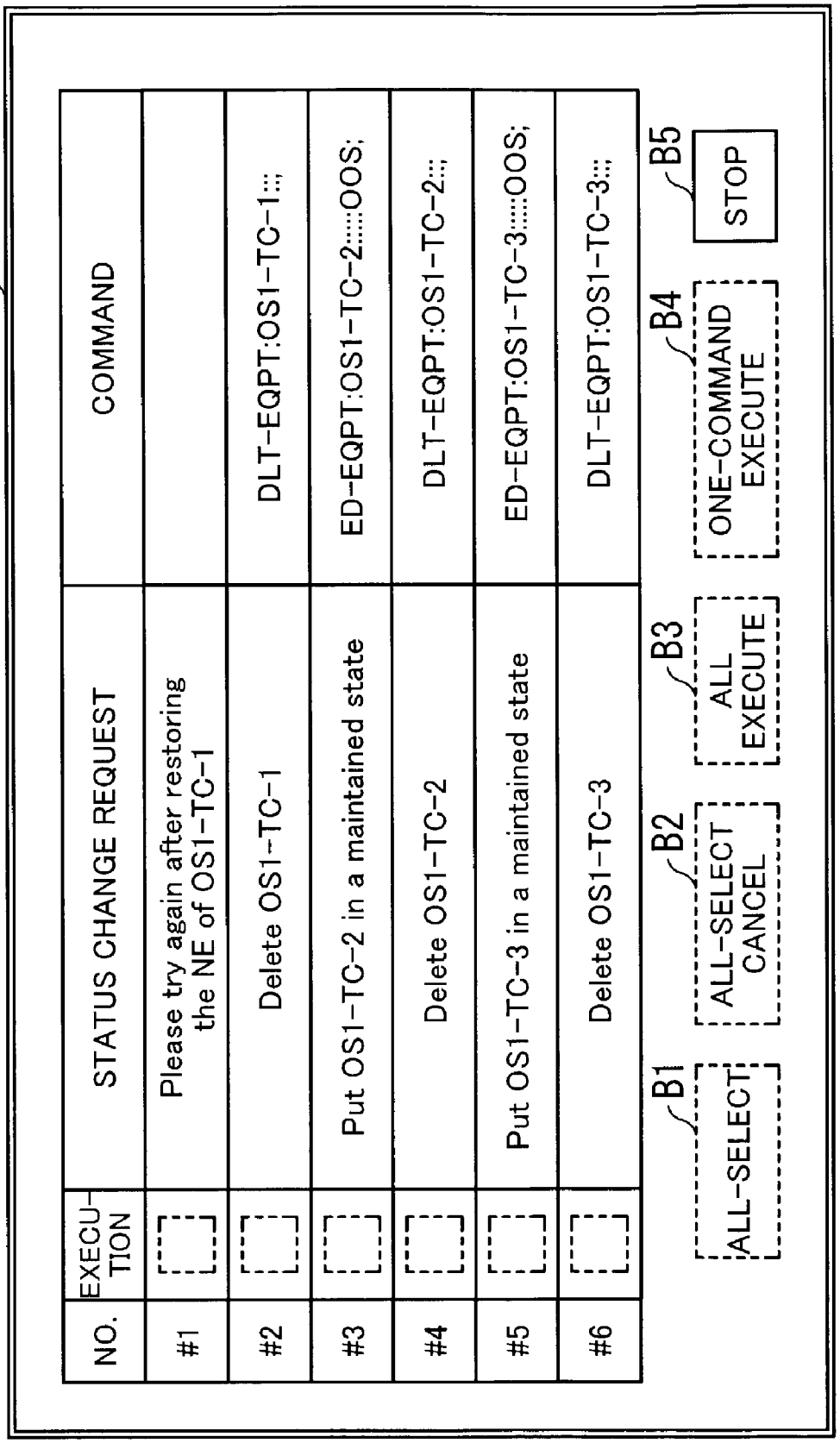
FIG. 12 illustrates yet another example of the display screen of the network management apparatus according to the present invention.

FIG. 12 illustrates yet another example of the display screen of the network management apparatus 10. In this example, the cause for being unable to avoid trouble extracted through the operation of FIG. 11 is shown. This display screen 13c differs from the display screen 13a of FIG. 8 in that an operator is not allowed to handle the row of #1, the execution boxes, and the buttons B1 through B4 (in FIG. 12, the items indicated by dotted lines cannot be handled by an operator).

In a case where the NE of OS1-TC-1 has a fault, the user interface unit 13 displays a comment "Please try again after restoring the NE of OS1-TC-1" in the space of the status change request of #1 (since there is no corresponding command, the command space is left empty).

In this example, since a fault has occurred in the NE of OS1-TC-1 that should be the first one to transmit a command, the other NEs cannot transmit a command. Accordingly, the user interface unit 13 displays all the execution boxes and the buttons B1 through B4 in such a manner that an operator cannot handle them. Thus, a wrong operation is prevented. When a display screen like this appears, an operator should press the stop button B5 to reset the operation, and restart an operation after recovering from the fault.

In the following, a trigger for conducting an analysis will be described. In the above description, when the analysis unit 12 performs an analysis of normality of a status change request, the analysis is conducted before a command corresponding to the status change request from an operator is transmitted to the NE 20.

More specifically, when receiving a status change request from an operator, the network management apparatus 10 automatically extracts the trouble shooting data for satisfying the restriction conditions or the cause for not being able to avoid trouble. After performing display control, the network management apparatus 10 transmits a command to the corresponding NE in accordance with an instruction of an operator. Here, the input of a status change request from an operator serves as a trigger for an analysis operation.

As another example, an analysis can be conducted in a case where a command corresponding to a status change request from an operator is transmitted to an NE and an error response is received in return.

To sum up, after receiving a status change request from an operator, the network management apparatus 10 generates a command corresponding to the status change request, and immediately transmits the command to the corresponding NE. Only when an error response is transmitted from the NE in return, does the network management apparatus 10 automatically extract the trouble shooting data for satisfying the restriction conditions or the cause for not being able to avoid trouble, or performs a display control operation. Here, the error response from the NE serves as a trigger for the analysis operation.

In this manner, when an analysis is to be conducted, either the input of a status change request from an operator or the receipt of an error response from an NE is used as a trigger. If there are no restriction conditions for the input of a status change request from an operator, the receipt of an error response from the corresponding NE should be used as a trigger. In this manner, the network management apparatus 10 can achieve a higher process speed.

The following is a description of an operation in a case where an error response is received, though all the trouble shooting data have been extracted through an analysis, and commands corresponding to the trouble shooting data have been generated and transmitted to the NEs.

A status change request from an operator is first inputted into the network management apparatus 10. The network management apparatus 10 then performs an analysis to extract and display all the trouble shooting data. The operator presses the all-select button to transmit the corresponding command to the corresponding NE. In such a case, as a suitable command corresponding to the trouble shooting data is generated in accordance with the present invention, no error response can be transmitted from the corresponding NE.

However, if the device statuses managed by the network management apparatus 10 are not exactly the same as the current device statuses of the NEs, an error response might be transmitted. Accordingly, when an error response is transmitted in response to a command generated through an analysis, the analysis unit 12 of the present invention determines that there are inconsistencies in the device statuses, and then performs a status matching operation. More specifically, the analysis unit 12 newly obtains the current device status of each NE, and reedits the device status table T1. The analysis unit 12 then performs an analysis again.

Figure 13:
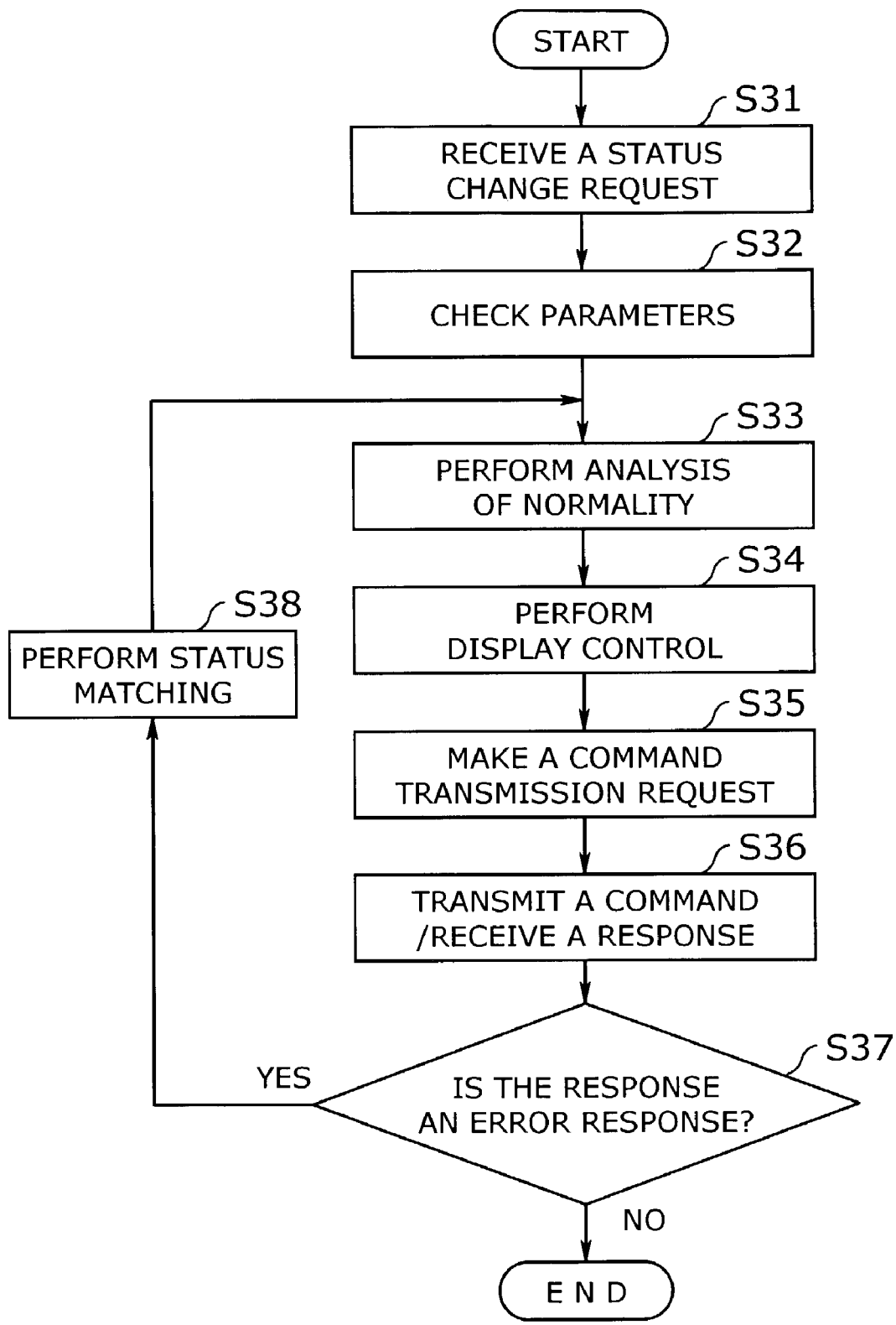
FIG. 13 is a flowchart of the entire operation according to the present invention.

Next, an operation in accordance with the present invention will be described in detail, with reference to flowcharts. FIG. 13 is a flowchart of the entire operation in accordance with the present invention. In this flowchart, the input of a status change request from an operator serves as a trigger for an analysis.

[S31] The user interface unit 13 receives a status change request from an operator.

[S32] The user interface unit 13 performs a parameter check on the status change request. If there is an error in the parameters, the user interface unit 13 displays the contents of the error.

[S33] The analysis unit 12 performs an analysis, using the device status table T1, the restriction condition table T2, and the trouble shooting table T3, which are stored and managed in the table storage unit 11. The analysis unit 12 then extracts and holds the trouble shooting data or the cause for not being able to avoid trouble.

[S34] The user interface unit 13 displays the trouble shooting data or the cause for not being able to avoid trouble.

[S35] The operator looks at the display screen, and makes a command transmission request.

[S36] The device communication unit 14 transmits a command corresponding to the trouble shooting data (or the status change request) to the corresponding NE. This command is generated in advance while the trouble shooting data are held by the analysis unit 12. The device communication unit 14 then receives a response from the NE.

[S37] The analysis unit 12 determines whether the response is an error response. If the response is not an error response, this status changing operation comes to an end. If the response is an error response, the operation moves on to step S38.

[S38] The analysis unit 12 determines that there are inconsistencies in the device statuses. The analysis unit 12 then accesses the NEs to obtain the current device statuses, and rewrites the device status table T1. After the rewriting of the device status table T1, the operation returns to step S33, and an analysis is conducted again.

Figure 14:
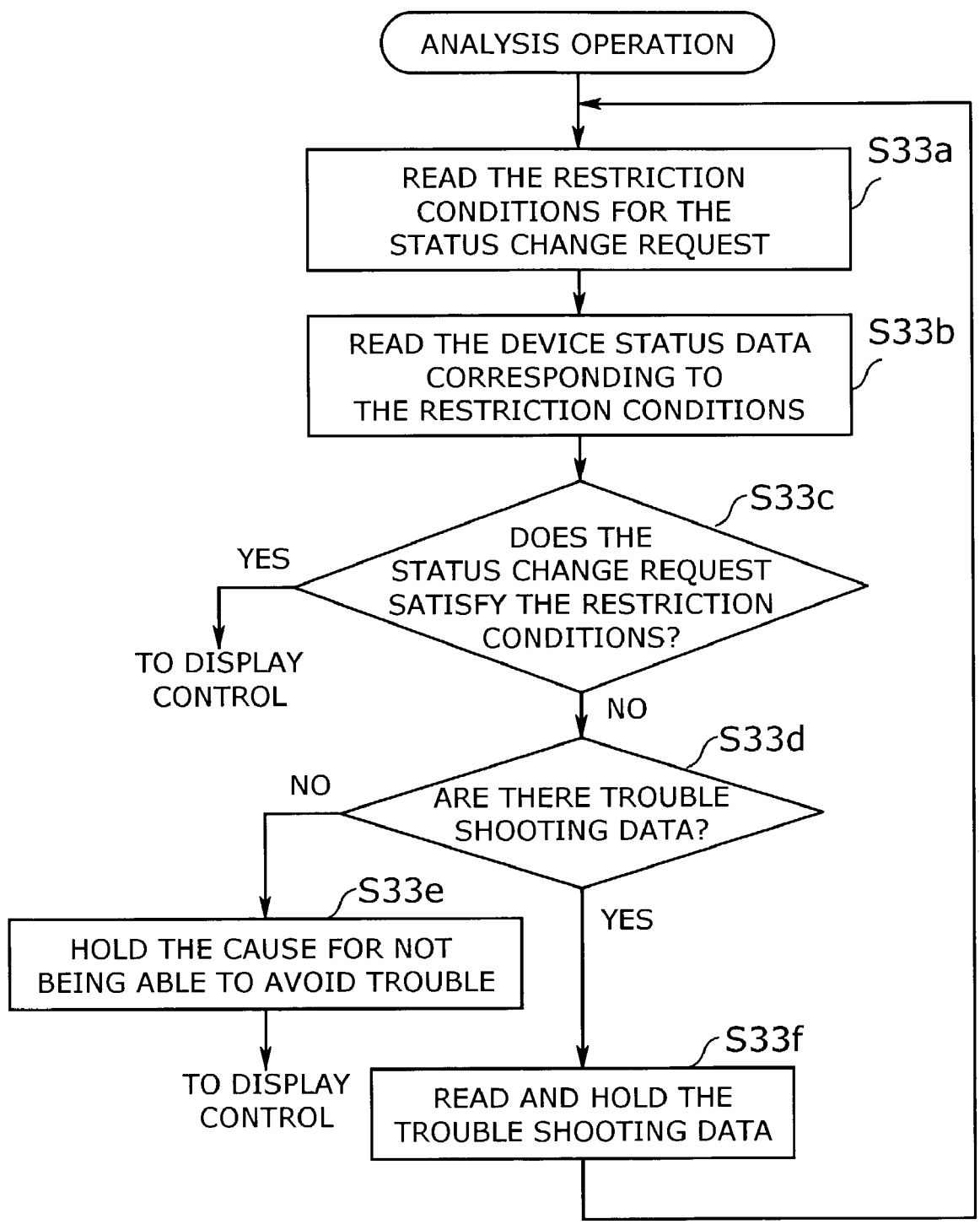
FIG. 14 is a flowchart of an analysis operation performed according to the present invention.

FIG. 14 is a flowchart of the analysis operation of step S33 performed by the analysis unit 12.

[S33a] The analysis unit 12 reads the restriction conditions for a status change request (i.e., a status change request inputted by an operator, or a status change request corresponding to the trouble shooting data) from the restriction condition table T2.

[S33b] The analysis unit 12 reads the device status data corresponding to the restriction conditions from the device status table T1.

[S33c] The analysis unit 12 determines whether the state change request satisfies the restriction conditions in the current device state. If the restriction conditions are satisfied, the operation proceeds to step S34 of FIG. 13. If the restriction conditions are not satisfied, the operation moves on to step S33d.

[S33d] The analysis unit 12 determines whether the trouble shooting table T3 includes the trouble shooting data for the status change request. If the trouble shooting table T3 does not include the trouble shooting data for the status change request, the operation moves on to step S33e. If the trouble shooting table T3 includes the trouble shooting data for the status change request, the operation moves on to step S33f.

[S33e] The analysis unit 12 holds the cause for not being able to avoid trouble. The operation then proceeds to the display control of step 34 of FIG. 13.

[S33f] The analysis unit 12 reads the trouble shooting data from the trouble shooting table T3, and holds the data. The operation then returns to step S33a.

As described so far, according to the present invention, the network management apparatus 10 automatically extracts and performs a trouble shooting operation suitable for a current device state. In this manner, an operator does not have to search for the restriction conditions for each status change request in advance, and the efficiency and workability in maintenance management operations can be improved accordingly. Also, even if the restriction conditions are changed by upgrading the NEs, all an operator has to do is to change the restriction condition data and the trouble shooting data. Thus, the operation efficiency can be improved.

In the above descriptions, the NEs are depicted as transmission devices, with specific parameter names used in the described operations. However, the NEs are not limited to transmission devices, and the attributes are not limited to "state". Therefore, the network management apparatus according to the present invention can be applied to a wide variety of fields.

As described above, the network management apparatus according to the present invention determines whether a status change request from an operator satisfies the restriction conditions in a current device state. If the restriction conditions are not satisfied but trouble can be avoided, the network management apparatus extracts all the trouble shooting data until the restriction problems are eliminated. If the restriction conditions are not satisfied and trouble cannot be avoided, the network management apparatus according to the present invention extracts the cause for not being able to avoid trouble, and performs an analysis of normality of the status change request. Based on the trouble shooting data, the network management apparatus generates a command corresponding to the status change request for solving the problem, and transmits the command to the corresponding network element. In this manner, the network management apparatus automatically performs a trouble shooting operation suitable for the current device state. Thus, an operator does not have to search for the restriction conditions for each status change request in advance. Accordingly, the operation efficiency and workability in maintenance management operations can be dramatically improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network management apparatus that performs a network management operation, comprising:
    a table storage unit that stores a device status table managing current device statuses, a restriction condition table managing restriction conditions for each network device to receive a status change request, and a trouble shooting table managing trouble shooting data for solving problems that are the causes of restrictions;
    wherein the device status table includes device names and attribute values indicating the current device statuses,
    wherein the restriction condition table includes restriction conditions, request contents indicating a status change request of a device registered to the device status table and multiple conditions indicating whether the contents of the restriction conditions continue to a next row of the restriction condition table,
    wherein the trouble shooting table includes current device status values, changed device status values and the trouble shooting data indicating a state transition so as to switch from the current device status values to the changed device status values,
    an analysis unit that determines from the tables stored in the table storage unit whether a status change request satisfies restriction conditions in a current device state, extracts all trouble shooting data from the trouble shooting table until the restriction problems are eliminated when the restriction conditions are not satisfied but trouble can be avoided, and extracts causes for being unable to avoid trouble when the restriction conditions are not satisfied and trouble cannot be avoided, thereby performing an analysis of normality of the status change request;
    a user interface unit that performs a user interface operation, and sends the extracted trouble shooting data or the causes for being unable to avoid trouble; and
    a device communication unit that generates from the trouble shooting data a command corresponding to a status change request for solving a problem, transmits the command to a corresponding network device, and receives a response from the network device,
    wherein, after receiving an error response to the command transmitted to the network device, though all the trouble shooting data have been extracted through the analysis, and commands corresponding to the trouble shooting data have been generated and transmitted to respective network devices, the analysis unit determines that there are inconsistencies in the devices statuses, and then newly obtains the current device status of the network device, reedits the device status table, carries out status matching, and performs an analysis again.

2. The network management apparatus according to claim 1, wherein the analysis unit automatically performs an analysis before a command corresponding to a status change request from an operator is transmitted to a network device or after an error response to a command corresponding to a status change request from an operator is received from a network device.

3. The network management apparatus according to claim 1, wherein, when the user interface unit displays a series of trouble shooting data 1, 2, . . . k−1, k, . . . n and an operator designates only the trouble shooting data of k−1 among the trouble shooting data of 1 through n, the device communication unit transmits commands corresponding to trouble shooting data of 1 through k−1 to the corresponding network devices and does not transmit commands corresponding to trouble shooting data of k through n to corresponding network devices, where k is greater than or equal to 2 and less than n.

4. The network management apparatus according to claim 1, wherein the user interface unit puts such a display image on the display screen that an operator cannot make a status change, when there is a cause for being unable to avoid trouble.

5. A network management system that performs network management, comprising:
    network devices that constitute a network;
    and a network management apparatus that includes:
    a table storage unit that stores a device status table managing current device statuses, a restriction condition table managing restriction conditions for the network devices to receive status change requests, and a trouble shooting table managing trouble shooting data for solving problems that are causes of restrictions;
    an analysis unit that determines from the tables stored in the table storage unit whether each status change request satisfies restriction conditions in a current device state, extracts all trouble shooting data from the trouble shooting table until the restriction problems are eliminated when the restriction conditions are not satisfied but trouble can be avoided, and extracts causes for being unable to avoid trouble when the restriction conditions are not satisfied and trouble cannot be avoided, thereby performing an analysis of normality of the status change request;
    a user interface unit that performs a user interface operation, and sends extracted trouble shooting data or the causes for being unable to avoid trouble; and
    a device communication unit that generates from the trouble shooting data a command corresponding to a status change request for solving a problem, transmits the command to the corresponding one of the network devices, and receives a response from the network device
    wherein the device status table includes device names and attribute values indicating the current device statuses,
    wherein the restriction condition table includes restriction conditions, request contents indicating a status change request of a device registered to the device status table and multiple conditions indicating whether the contents of the restriction conditions continue to a next row of the restriction condition table,
    wherein the trouble shooting table includes current device status values, changed device status values and the trouble shooting data indicating a state transition so as to switch from the current device status values to the changed device status values, wherein, after receiving an error response to the command transmitted to the network device, though all the trouble shooting data have been extracted through the analysis, and commands corresponding to the trouble shooting data have been generated and transmitted to respective network devices, the analysis unit determines that there are inconsistencies in the devices statuses, and then newly obtains the current device status of the network device, reedits the device status table, carries out status matching, and performs an analysis again.

6. The network management system according to claim 5, wherein the analysis unit automatically performs an analysis before a command corresponding to a status change request from an operator is transmitted to a network device or after an error response to a command corresponding to a status change request from an operator is received from a network device.

7. The network management system according to claim 5, wherein, when the user interface unit displays a series of the trouble shooting data 1, 2, . . ., k−1, k, . . . n and an operator designates only the trouble shooting data of k−1 among the trouble shooting data of 1 through n, the device communication unit transmits commands corresponding to trouble shooting data of 1 through k−1 to the corresponding network devices and does not transmit commands corresponding to trouble shooting data of k through n to corresponding network devices, where k is greater than or equal to 2 and less than n.

8. The network management system according to claim 5, wherein the user interface unit puts such a display image on the display screen that an operator cannot make a status change, when there is a cause for being unable to avoid trouble.

9. A network management method for conducting network management, comprising the steps of:
storing a device status table managing current device statuses, a restriction condition table managing restriction conditions for network devices to receive status change requests, and a trouble shooting table managing trouble shooting data for solving a problem that is a cause for restrictions;

wherein the device status table includes device names and attribute values indicating the current device statuses, wherein the restriction condition table includes restriction conditions, request contents indicating a status change request of a device registered to the device status table and multiple conditions indicating whether the contents of the restriction conditions continue to a next row of the restriction condition table, wherein the trouble shooting table includes current device status values, changed device status values and the trouble shooting data indicating a state transition so as to switch from the current device status values to the changed device status values, determining whether a status change request satisfies restriction conditions in a current device state;

performing an analysis of normality of the status change request by extracting all the trouble shooting data from the trouble shooting table until the restriction problems are eliminated when the restriction conditions are not satisfied but trouble can be avoided, or by extracting causes for being unable to avoid trouble when the restriction conditions are not satisfied and trouble cannot be avoided;

performing a user interface operation to send the extracted trouble shooting data or the causes for being unable to avoid trouble; and generating from the trouble shooting data a command corresponding to the status change request for solving the problem, so as to transmit the command to the corresponding network device, and receive a response, wherein, after receiving an error response to the command transmitted to the network device, though all the trouble shooting data have been extracted through the analysis, and commands corresponding to the trouble shooting data have been generated and transmitted to respective network devices, the analysis unit determines that there are inconsistencies in the devices statuses, and then newly obtains the current device status of the network device, re-edits the device status table, carries out status matching, and performs an analysis again.

* * * * *